UNITED STATES PATENT OFFICE.

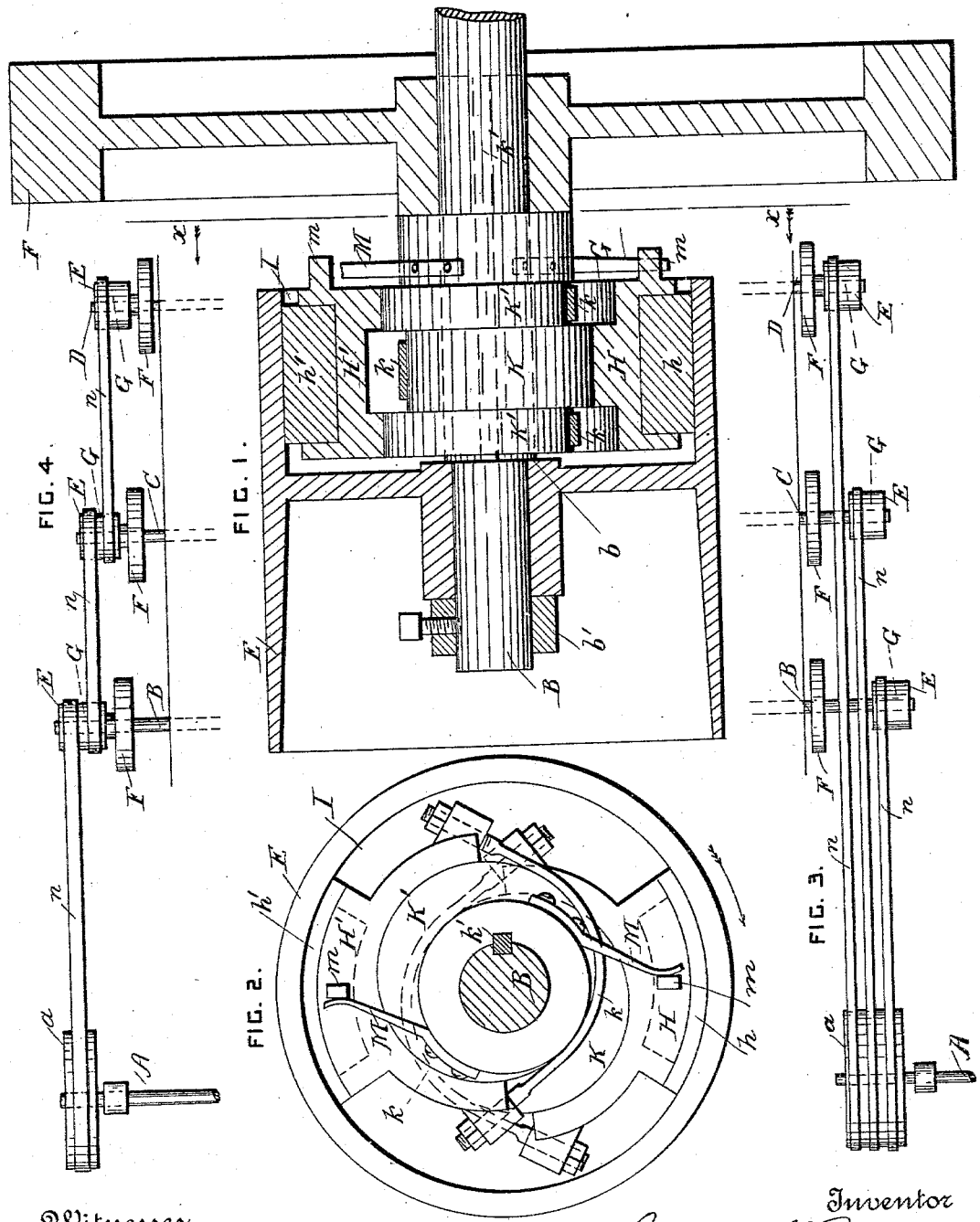

EDMUND H. PROBSTFIELD, OF MOORHEAD, MINNESOTA.

MECHANISM FOR DISTRIBUTING POWER.

SPECIFICATION forming part of Letters Patent No. 559,745, dated May 5, 1896.

Application filed March 2, 1896. Serial No. 581,559. (No model.)

*To all whom it may concern:*

Be it known that I, EDMUND H. PROBSTFIELD, a citizen of the United States, residing at Moorhead, in the county of Clay and State of Minnesota, have invented certain new and useful Improvements in Mechanism for Distributing Power; and I do hereby declare the following to be a full, clear, and exact description of the invention, such as will enable others skilled in the art to which it appertains to make and use the same.

This invention relates to mechanism for distributing power; and it consists in the novel construction and combination of the parts hereinafter fully described and claimed.

In the drawings, Figure 1 is a longitudinal section through one of the devices used in carrying out this invention. Fig. 2 is a cross-section taken on the line $x$ $x$ in Fig. 1 and looking in the direction of the arrows. Figs. 3 and 4 are diagrammatic plan views showing how the power-distributing mechanism is applied.

This invention is adapted for use when a single main shaft, motor, or engine is used to drive more than one machine or mechanism and when any one of the said machines or mechanisms is liable to temporarily require additional power. An example of this occurs in an ordinary threshing-machine.

In Figs. 3 and 4, A represents the crank-shaft or main driving-shaft of a motor or engine of any approved construction. B is the shaft which drives the threshing-cylinder. C is the shaft which drives the fan, and D is the shaft which drives the pneumatic straw-stacker. All of these shafts are operatively connected with the driving-pulley $a$ of the engine, which pulley is secured on the main shaft A. When too much grain is suddenly fed into the cylinder, or too much straw is thrust into the straw-stacker, the engine ordinarily has to drive the additional load, as well as its whole normal load, and the engine therefore has to be powerful enough to drive the greatest possible accumulation of loads.

According to this invention the engine is relieved automatically from a portion of its normal load when an additional load is suddenly thrown on it by any one of the machines or mechanisms driven by it, so that a less powerful engine is enabled to accomplish the same work.

In Figs. 1 and 2, B is the shaft of a threshing-cylinder; but it may also be the driving-shaft of any other machine or mechanism. E is the driving-pulley, which runs loose upon the shaft B, or upon any other similar shaft, such as C or D. The shaft B has a shoulder $b$ and a collar $b'$ for holding the pulley E in position longitudinally. F is a fly-wheel or other similar or equivalent accumulator of power. The fly-wheel F is secured to the shaft B, and G is an automatically-releasable clutch normally connecting the pulley E to the shaft B. The clutch G is preferably a friction-clutch, and any approved form of friction-clutch may be used which is automatically releasable in one direction. A satisfactory form of friction-clutch consists of two wedge-shaped shoes H and H', provided with clutch-segments $h$ and $h'$, of wood or other similar material. The interior of one side of the pulley E is provided with a cylinder I, which forms one clutch member. The clutch segments or blocks $h$ and $h'$ are respectively pressed against the periphery of the cylinder I by the single eccentric K and the double eccentric K'. The shoes H and H' are provided with straps $k$, for the purpose of keeping the clutch-segments in position with regard to the eccentrics. The eccentrics are secured to the shaft B by the same key $k'$ which secures the fly-wheel to the shaft; but they may be secured to the said shaft separately, or they may be cast integral with or otherwise secured to the fly-wheel. Each shoe H and H' is provided with a projecting lug $m$, and M is a spring which bears against the said lug and is secured to the hub of the eccentric or to any other part which is secured to the shaft B. These springs press forward the shoes and clutch-segments into the wedge-shaped spaces between the eccentrics and the cylinder I. These springs are made as light as possible as will permit them to hold the clutch-segments in contact with the periphery of the cylinder. Two eccentrics are preferably used and are arranged with their centers on opposite sides of the center of the shaft B, but only one eccentric or more than two eccentrics may be used, if desired. The various pulleys E are operatively connected with the driving-pulley *a* of the engine by belts *n*. These belts may be arranged "in parallel," as shown in Fig. 3, or "in series," as shown in Fig. 4. Instead of belt-pulleys and belts any equivalent power-transmitting devices may be used, such as toothed wheels or sprocket-wheels and drive-chains.

The operation of the power-distributing devices is as follows: When the pulley E is revolved in the direction of the arrow in Fig. 2, the wedge-shaped shoes and clutch-blocks of the automatically-releasable clutches jam between the eccentrics and the cylinders I, and the heavier the load the more tightly are the said parts pressed together. The pulleys E revolve the automatically-releasable clutches and the fly-wheels, and the shafts B, C, and D are revolved from the pulley *a* on the main shaft as long as the loads or resistances of the machines or mechanisms connected to the said shafts remain normal. If a large bundle of grain is thrust into the cylinder and the load to be driven by the shaft B is thereby materially increased, the shaft B, the pulley E, mounted on the said shaft B, and the pulley *a* are all slightly retarded in speed. This retardation in speed or velocity is also communicated to the other pulleys E, but it is not communicated to the shafts C and D, because the fly-wheels secured to those shafts have accumulated sufficient energy to prevent any sudden retardation in the speed of these shafts C and D. The fly-wheels on the shafts C and D therefore turn the eccentrics in the clutch-shoes and automatically release the cylinder I from contact with the clutch-blocks. For the time being the machines or mechanisms connected to the shafts C and D are wholly driven by the fly-wheels secured to those shafts, and the total load on the engine is therefore lightened to that extent. The whole power of the engine is therefore concentrated upon the mechanism or machine driven by the shaft B, and the temporary additional load upon that shaft is quickly overcome without requiring the power of the engine to be increased to any material extent. As soon as the additional or unusual load on the shaft B has been overcome and the shaft B resumes its normal speed the automatic clutches on the shafts C and D reconnect their driving-pulleys with the said shafts, and all the machines or mechanisms are driven the same as at first. A similar effect is produced when an additional load is thrown temporarily upon either of the other shafts C and D. All the power of the engine is concentrated upon the machine or mechanism of which the driving-shaft is retarded in speed, and the other machines or mechanisms are temporarily driven by the fly-wheels secured to their driving-shafts.

It is obvious that as a mechanical equivalent any fly-wheel may be secured on a counter-shaft geared to the driving-shaft, instead of being secured on the driving-shaft itself.

It will be seen that the retardation of any one machine, due to a sudden increase of its load, does not cause any retardation in the speed of the other machines or mechanisms which are operated from the same main shaft, motor, or engine.

When a single main shaft is used to drive only two machines, either or both machines may be provided with a loose pulley, an automatically-disengageable clutch, and a fly-wheel. When both are thus provided, either may be overloaded temporarily without affecting the speed of the other; but when only one is thus provided the other is the only one which can thus be temporarily overloaded without increasing the load on the main shaft or engine.

What I claim is—

1. The combination, with a plurality of machines or mechanisms deriving motion from a single main shaft, of driving devices journaled on the driving-shafts of the said machines or mechanisms, fly-wheels secured to the said shafts, and automatically-disengageable clutches operatively connecting the said driving devices with the said shafts until the speed of the said driving devices becomes less than that of the shafts to which the said driving devices pertain, substantially as set forth.

2. The combination, with a plurality of machines or mechanisms, and a single main shaft; of a driving device journaled on the driving-shaft of one of the said machines or mechanisms, a fly-wheel secured to the said shaft, an automatically-disengageable clutch operatively connecting the said driving device with the said shaft until the speed of the said driving device becomes less than that of the said shaft; and means for connecting the said main shaft with the said driving device and with the other said machine or mechanism, substantially as set forth.

3. The combination, with the driving-shaft of a machine or mechanism, and a fly-wheel secured thereto; of a driving device journaled on the said shaft, and an automatically-disengageable clutch operatively connecting the said driving device with the said shaft until the speed of the said driving device becomes less than that of the said shaft, substantially as set forth.

4. The combination, with the driving-shaft of a machine or mechanism, and a fly-wheel secured thereto; of a driving device journaled on the said shaft and provided with an internal cylinder, an eccentric secured on the said shaft, a wedge-shaped shoe provided with a clutch-segment and carried by the said eccentric, and a spring normally holding the said clutch-segment in contact with the said cylinder, substantially as set forth.

5. The combination, with the driving-shaft of a machine or mechanism, and a fly-wheel secured thereto; of a driving device journaled on the said shaft and provided with an internal cylinder, a single eccentric and a double eccentric secured on the said shaft with their centers arranged on opposite sides of its center, wedge-shaped shoes provided with clutch-segments and carried by the said eccentrics, and springs normally holding the said clutch-segments in contact with the said cylinder, substantially as set forth.

In testimony whereof I affix my signature in presence of two witnesses.

EDMUND H. PROBSTFIELD.

Witnesses:
G. IRVIN ANDERSON,
DANIEL S. BEARD.